United States Patent [19]

Fisher

[11] 4,365,756

[45] Dec. 28, 1982

[54] FUEL INJECTION VALVE ASSEMBLY FOR RECIPROCATING GAS ENGINE

[76] Inventor: Timothy Z. Fisher, 16222 Tibet Rd., Friendswood, Tex. 77546

[21] Appl. No.: 176,980

[22] Filed: Aug. 11, 1980

[51] Int. Cl.³ .............................................. B05B 1/30
[52] U.S. Cl. ................................. 239/533.2; 239/600
[58] Field of Search ................ 239/600, 533.2–533.12; 123/27 GE, 294, 527, 470

[56] References Cited

U.S. PATENT DOCUMENTS

| | | | |
|---|---|---|---|
| 2,126,440 | 8/1938 | Apthorp | 239/600 |
| 3,279,706 | 10/1966 | Kennedy | 239/533 |
| 3,705,693 | 12/1972 | Franz | 239/600 |
| 3,717,305 | 2/1973 | Hedges | 239/288.5 |
| 3,791,591 | 2/1974 | Hedges | 239/533 |
| 3,827,638 | 8/1974 | Halvorsen | 239/534 |
| 3,924,583 | 12/1975 | Jardin | 123/32 |
| 4,111,370 | 9/1978 | Chelgren | 239/533.3 |

OTHER PUBLICATIONS

Product Brochure for "Fuel Valve Cartridge Systems" produced by Wesco Valve & Mfg. Co. of Marshall, Tex.

Brochure entitled "The Modern Technology of Diesel Engines," Transamerica Deleval, Inc.

Primary Examiner—Andres Kashnikow
Assistant Examiner—Gene A. Church
Attorney, Agent, or Firm—Arnold, White & Durkee

[57] ABSTRACT

A fuel injection valve assembly is provided for use in a reciprocating gas engine. The valve assembly comprises a valve cage, a replaceable valve cartridge, a keeper ring, and an external spring. The valve cartridge is replaceable without the necessity of removing the valve cage from the engine.

33 Claims, 4 Drawing Figures

FUEL INJECTION VALVE ASSEMBLY FOR RECIPROCATING GAS ENGINE

BACKGROUND OF THE INVENTION

1. Field of the Invention

This invention relates generally to a fuel injection valve assembly for use in a reciprocating gas engine and more particularly to a replaceable valve cartridge for use in a fuel injection system for a reciprocating gas engine.

2. Description of the Prior Art

For reciprocating engines that operate by internal combustion of a gaseous fuel such as natural gas, fuel injection valve assemblies are critical components. Typically, each combustion cylinder of such a reciprocating engine has a fuel injection valve assembly, the smooth operation of which is necessary for safe and efficient running of the engine.

These fuel injection valve assemblies require frequent repair due to such problems as deterioration of valve packing or development of a defective valve element. These frequent repairs have proved to be costly and time-consuming. Typically, these repairs have required the engine user to remove the entire valve assembly from the engine block and to send the entire assembly to the manufacturer for reworking or rebuilding. This requirement, of course, has resulted in long periods of engine downtime.

The prior art has attempted to alleviate some of the problems associated with these fuel injection valve assemblies by providing a valve cartridge containing the valve, valve seat, valve stem, and critical packing elements needing frequent replacement or repair. The introduction of this valve cartridge construction for fuel injection valve assemblies has allowed for the shipping, repairing, and stocking of the valve cartridges rather than the very much bulkier total valve assemblies.

A typical prior art fuel injection valve assembly of the cartridge type comprises a valve cage, a valve cartridge, a keeper ring, and an external spring. The valve cage is usually the largest component of the assembly and supports the other components as the assembly is mounted on the engine body. The prior art valve cage has a cartridge-receiving bore therein for receiving the valve cartridge through the end of the bore nearer the inside the engine. When completely assembled with the other components, the cartridge is held in place by the keeper ring that is attached to the valve stem at the end of the cartridge nearer the outside of the engine. The external spring is located between the keeper ring and the valve cage so as to bias the valve in the closed position. The entire assembly is adapted for mounting on the body of the engine by the insertion of cylindrical lower portions of the valve cage and valve cartridge into an opening in the engine body leading to a combustion chamber. Because the prior art valve cage has a cartridge-receiving bore therein for receiving the valve cartridge through the end of the bore nearer the inside of the engine, the valve cartridge must be placed in the valve cage before the valve assembly can be inserted into the engine.

The prior art valve cartridge usually comprises a stem housing, a valve seat at the end of the stem housing nearer the engine, and a valve having a valve face adapted to fit tightly against the face of the valve seat and a valve stem attached to the valve face portion and passing through the stem housing. The valve seat is typically welded to the stem housing and often has a diameter greater than the diameter of the cartridge-receiving bore in the cage.

In all instances known, the prior art valve cartridges are sealed against their respective valve cages by means of a gasket placed between the end of the cage nearer the inside of the engine and a corresponding portion of the valve cartridge equal in diameter to the end of the valve cage. Such a prior art fuel injection valve assembly is manufactured by Wesco Valve & Manufacturing Company, of Marshall, Tex.

An inherent disadvantage in the typical prior art fuel injection valve assemblies is that the entire assembly, including the cage, must be removed anytime a repair is required to any element of the assembly. Since most repairs are required on components of the valve cartridge, it would be advantageous to provide a valve assembly whereby the valve cartridge may be removed from the body of the engine without the necessity of also removing the valve cage.

Several patents have dealt with the general feature of removeability with regard to fuel injection assemblies. However, all of these patents are directed to fuel injection nozzles of the pencil type, that is, the type normally used in diesel engines, an environment totally different from the gas engines where the present invention is used. U.S. Pat. No. 3,924,583 to Jardin discloses an improved mounting apparatus for a diesel fuel injection nozzle to permit selective withdrawal of the nozzle from the engine. U.S. Pat. Nos. 3,791,591 and 3,717,305 both to Hedges disclose improved fuel injection nozzle arrangements which are specifically designed to facilitate the removal of the fuel injection system for replacement and maintenance purposes. Other patents also directed to fuel injection nozzles are U.S. Pat. No. 4,111,370 to Chelgren, U.S. Pat. No. 3,827,638 to Halvorsen, U.S. Pat. No. 3,705,693 to Franz, and U.S. Pat. No. 3,279,706 to Kennedy.

SUMMARY OF THE INVENTION

By means of the present invention, there is provided an improved fuel injection valve assembly for use in a reciprocating gas engine that is substantially free of the disadvantages of the prior art. The fuel injection valve assembly of the present invention comprises: a valve cage adapted for mounting on the body of a reciprocating gas engine and having a cartridge-receiving bore with threads at the end of the bore nearer the outside of the engine; a valve cartridge having a stem housing with outside threads for engaging the threads of the cartridge-receiving bore, a valve seat at the end opposite the outside threads, and a valve having a frustoconical element with a valve face and a valve stem attached to the frustoconical element and passing through the stem housing; a keeper ring for engaging with the end of the valve stem opposite the valve face; and an external spring between the keeper ring and valve cage for biasing the valve in the closed position.

The fuel injection valve assembly of the present invention is thus constructed so that the diameter of that portion of the valve cartridge below its outside threads is of lesser diameter than the inside diameter of the valve cage. This construction provides a major advantage over prior art fuel injection valve assemblies in that the valve cartridge can be removed from the engine for repair or replacement without the necessity of also removing the valve cage. This advantage results in greatly decreased replacement time and thus provides a significant decrease in gas engine downtime.

In one embodiment, the valve seat is a part of the structure of the stem housing and is located in a cylindrical extension of the stem housing that is less in diameter than the remainder of the stem housing. The stem housing further includes a gasket and gasket-retaining groove located where the cylindrical extension and the remainder of the stem housing meet. The gasket provides a tight seal between the valve cartridge and the valve cage. The gasket-retaining groove enables the gasket to be removed from the assembly when the valve cartridge is removed for repair or replacement.

In the preferred embodiment, the valve seat is separate from the stem housing and has a seat face at one end and a first cylindrical extension at the other end for fitting tightly into a counterbore in the stem housing at the end opposite the outside threads. This separate valve seat also further includes a gasket and gasket-retaining groove for providing a tight seal between the valve cartridge and the valve cage. The valve assembly of this preferred embodiment provides advantageously for the replacement of the valve seat after removal of the cartridge without the necessity of replacing the entire valve cartridge.

In another aspect of the invention, the stem housing comprises at least one interior bushing for guiding the valve stem, packing and a packing biasing spring providing a seal against the valve stem, a collar located above the outside threads for supporting the external spring, and an interior collar bushing for further guiding the valve stem. The collar also provides an advantageous means for gripping the entire valve cartridge when the cartridge is screwed into or out of the valve cage. An O-ring encircling the stem housing may be provided between the collar and the outside threads to form a tight seal with the valve cage.

In a further aspect of the invention, the valve cage may be provided with an O-ring encircling its cylindrical lower portion. This O-ring provides a seal between the valve cage and the cylindrical opening in the engine body into which the lower portion of the valve cage is inserted.

These and other objects, advantages, and features of the present invention will hereinafter appear, and, for purposes of illustration but not of limitation, exemplary embodiments of the present invention are shown in the appended drawings and described in the detailed description of the preferred embodiment.

DESCRIPTION OF THE PREFERRED EMBODIMENT

Throughout the following description, similar reference numerals refer to similar elements in all figures of the drawings.

Figure 1:
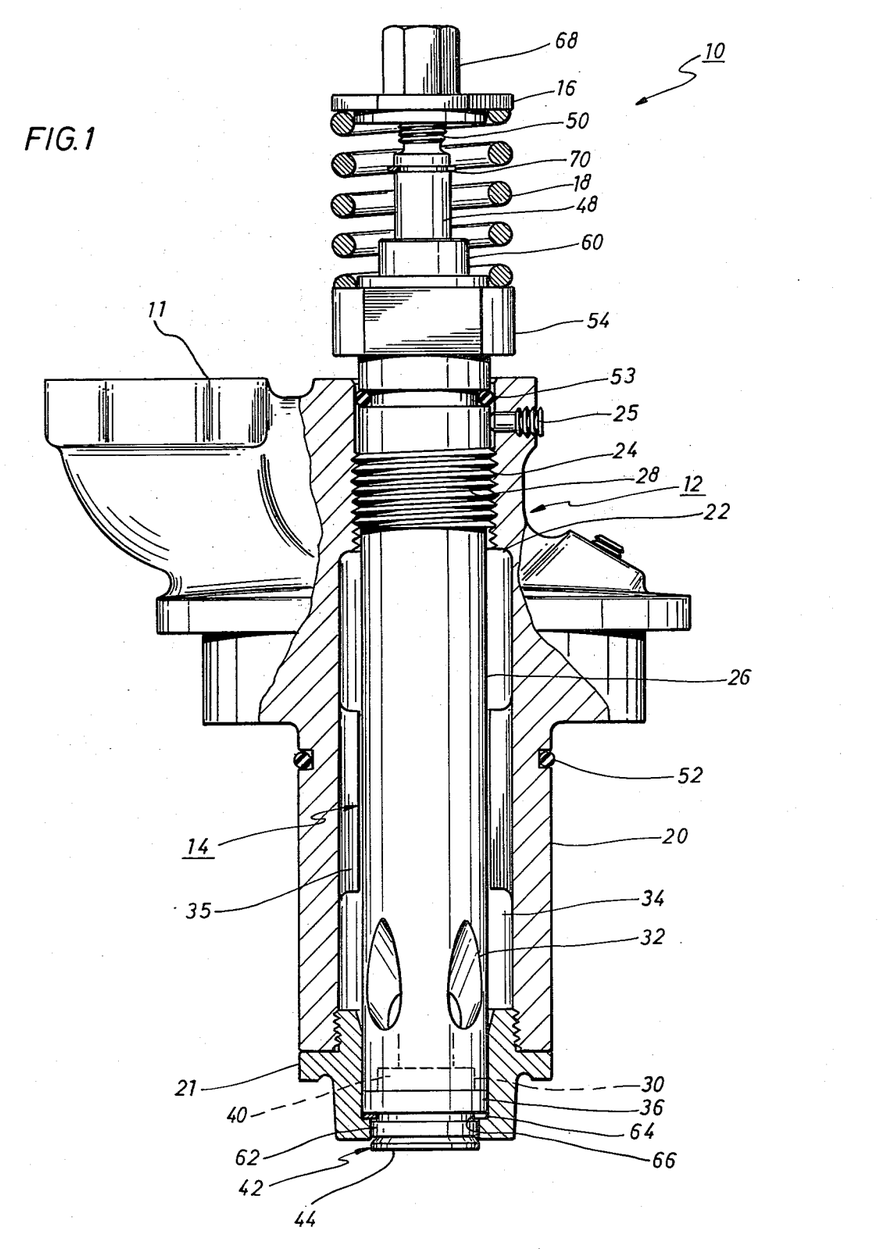
FIG. 1 is a side view of the preferred embodiment of the fuel injection valve assembly of the present invention, partially broken away for disclosure of detail.

Referring to FIG. 1, there is shown the preferred embodiment of a fuel injection valve assembly 10 of the present invention comprising a valve cage 12, a valve cartridge 14, a keeper ring 16, and an external spring 18. The valve cage 12 is adapted for mounting on the body of a reciprocating gas engine (not shown) by insertion of a cylindrical lower portion 20 into an opening in the engine body leading to a combustion chamber. A separate valve seat adapter 21 is provided and threadably engages the cylindrical lower portion of the valve cage 12. It is to be understood that the valve cage and the seat adaptor may be provided as a single piece. Alternatively, the seat adaptor 21 may be welded into the lower portion 20 of the valve cage. Encircling the cylindrical lower portion 20 of the valve cage 12 is an O-ring 52. This optional O-ring provides a seal between the valve cage and the opening in the engine body into which the cylindrical lower portion is inserted. The valve cage has a cartridge-receiving bore 22 with threads 24 at the end of the bore nearer the outside of the engine. A lock pin 25 is provided to prevent the valve cartridge 14 from backing out of the valve cage.

The valve cartridge 14 comprises a stem housing 26 with outside threads 28 for engaging the threads of the cartridge-receiving bore 22, a counterbore 30 at the end opposite the outside threads 28, and fuel seat ports 32 located between the outside threads 28 and the counterbore 30 and adapted for the flow of fuel from an annular space 34, between the inside wall of the valve cage 12 and the outside of the valve cartridge 14, to a combustion chamber of the engine. The ports 32 are inclined so that the fuel enters directly into the stem housing 26 without a swirling effect. The valve cartridge further comprises a valve 42 with a substantially frustoconical element 44 having a valve face 46 adapted to fit tightly against a seat face 38 and a valve stem 48 attached to the frustoconical element 44 and passing through the stem housing 26 and a valve seat 36. The valve stem 48 has threads at the opposite end of the stem from the frustoconical element for engaging the keeper ring 16. The valve stem has a reduced diameter at the end nearer the frustoconical element 44 to provide less restricted fuel flow through the valve 42 into the combustion chamber of the engine, as discussed more fully herein. The external spring 18, located between the keeper ring and the valve cage, biases the valve 42 in the closed position.

Figure 2:
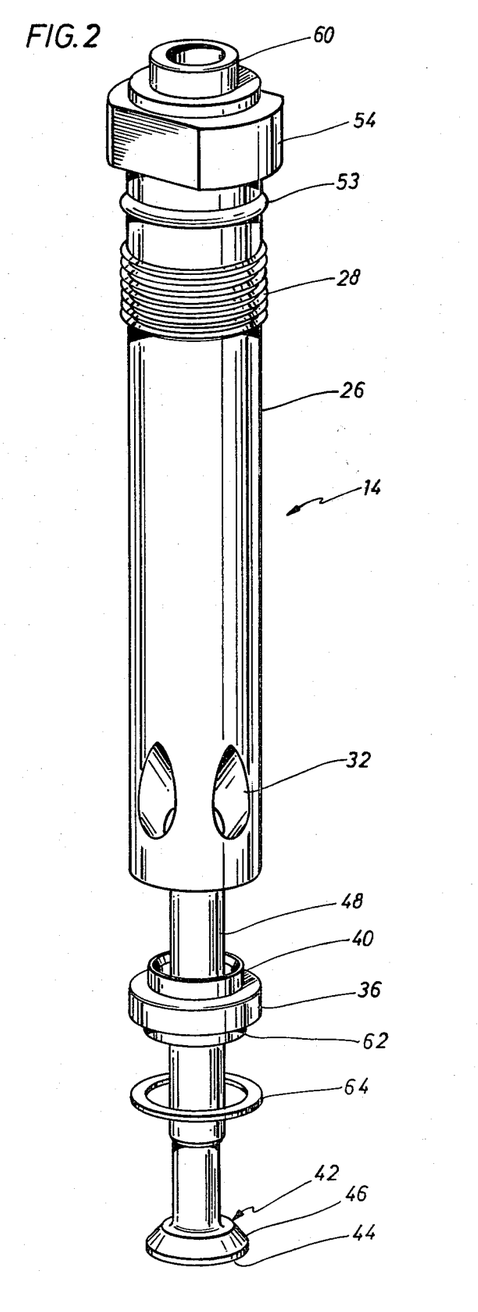
FIG. 2 is an exploded isometric view of the preferred embodiment of the valve cartridge of the present invention.
Figure 3:
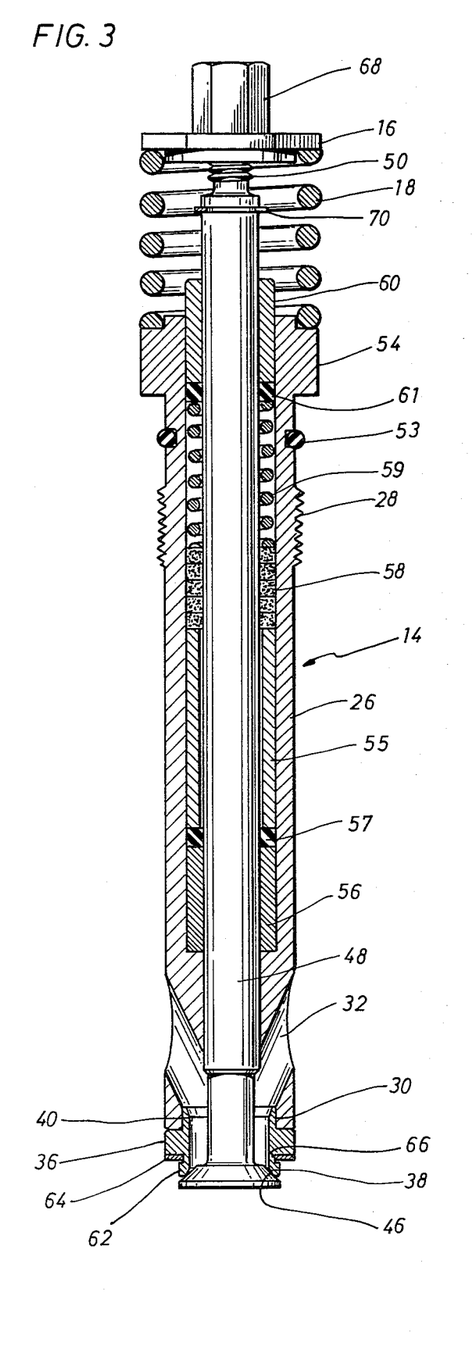
FIG. 3 is a side elevation view of the preferred embodiment of the valve cartridge of the present invention, partially broken away for disclosure of detail.

Referring now to FIGS. 2 and 3, shown are an exploded isometric view and a side elevation view, respectively, of the preferred embodiment of the replaceable valve cartridge of the present invention. As shown, the stem housing 26 is provided with a collar 54 located above the outside threads 28. The collar provides a bottom support for the external spring 18 to rest upon, or otherwise exert a force against, in biasing the valve in the closed position. In addition, collar 54 provides a convenient means, or wrench flats, for gripping the entire cartridge when the cartridge is screwed into or out of the valve cage. Encircling the stem housing between the collar 54 and the outside threads 28 is an O-ring 53. This optional O-ring provides a seal between the stem housing and the valve cage to prevent fuel from leaking out of the valve assembly.

The stem housing 26 has at least one interior bushing 56 for guiding the valve stem 48. Although only one interior bushing is shown in FIG. 3, any number of interior bushings may be provided and still remain within the contemplation of the present invention. The stem housing further contains packing 58 and a packing biasing spring 59 for providing a gas seal against the valve stem and the interior surface of the stem housing 26. The packing 58 is located above a spacer element 55, having an inside diameter greater than the inside diameter of the interior bushing 56, in the interior of that section of the stem housing that includes the outside threads 28. The spacer 55 may, alternatively, be formed as part of the interior surface of the stem housing 26. The spacer displaces the packing 58 from the end of the stem housing subjected to higher temperatures. A collar bushing 60 is located in the interior of that section of the stem housing that includes collar 54 and provides additional guidance for the valve stem. A lower wiper element 57, having an inside diameter substantially equal to the diameter of the valve stem 48 and an outside diameter substantially equal to the inside diameter of the stem housing 26, is provided between the interior bushing 56 and the spacer 55. The wiper 57 prevents foreign matter from entering the packing 58 from the lower end of the valve cartridge 14. The packing biasing spring 59 is located between packing 58 and collar bushing 60 and biases the packing against interior bushing 56, thus creating a seal against the valve stem, the interior bushing, and the inside wall of the stem housing. An upper wiper element 61, substantially identical to the lower wiper 57, is located between the collar bushing 60 and the packing biasing spring 59 and prevents foreign matter from entering the packing 58 from the upper end of the valve cartridge.

In FIG. 2, the valve seat 36 is shown withdrawn from the counterbore 30 in the stem housing 26. The valve seat face 38 is located in a second cylindrical extension 62 of the valve seat on the side opposite a first cylindrical extension 40. The second cylindrical extension 62 has a diameter less than that of the stem housing. The valve seat further includes a gasket 64 and a gasket-retaining groove 66 located where the second cylindrical extension 62 and the remainder of the valve seat 36 meet (FIG. 3). The gasket provides a tight seal between the valve cartridge 14 and the valve cage 12 (i.e., the seat adaptor 21) and is preferably constructed of copper.

As is shown in FIG. 3, the first cylindrical extension 40 of the valve seat 36 fits tightly into the counterbore 30 of the stem housing 26. The valve face 46 and the valve seat face 38 are machined to form a tight shut-off. The valve stem 48 passes through the end of the stem housing 26 having the counterbore 30 and is secured by a nut 68 fastened above the keeper ring 16 by means of stem threads 50. A snap ring 70 is provided at the end of the stem 48 having the stem threads 50 to prevent the valve from falling into the combustion chamber of the engine should the nut 68 become loose or otherwise break off. When the valve cartridge 14 is threadably engaged into the valve cage 12, a seal is made between the valve seat 36 and the valve cage 12 by means of gasket 64. The gasket-retaining groove 66 provides a convenient means for retrieving the gasket and prevents the gasket from dropping into the engine or otherwise remaining in the valve cage when the cartridge is removed.

Since the valve seat face 38 is often the first portion of the fuel injection valve assembly to require repair, the preferred embodiment of the replaceable valve cartridge of the present invention provides the advantage of inexpensive and relatively less time-consuming maintenance. To replace the valve seat 36, the valve cartridge is removed from the valve cage without the necessity of also removing the valve cage from the engine. The valve seat may then be replaced without the necessity of replacing the entire valve cartridge. Furthermore, the packing 58 may be replaced while the valve cartridge is removed from the valve cage. When the necessary repairs are made to the components of the valve cartridge, it may be reinserted into the valve cage, or a new or reworked valve cartridge may be immediately inserted into the valve cage and the necessary repairs to the cartridge made when convenient. Thus, the downtime and cost of necessary maintenance are greatly reduced.

Although the valve cartridge 14 and its components, including the valve seat 36, have the structural configuration as shown in FIGS. 1, 2, and 3, it is to be understood that the valve cartridge may admit of any configuration, so long as the overall diameter of the valve cartridge (excluding the collar 54 and the stem housing threads 28) is less than the inside diameter of the valve cage, and still remain within the contemplation of the present invention. Furthermore, the various components of the fuel injection valve assembly may be composed of any suitable material and still remain within the contemplation of the present invention. It is preferable that the various components of the valve cartridge be machined rather than formed by casting.

Figure 4:
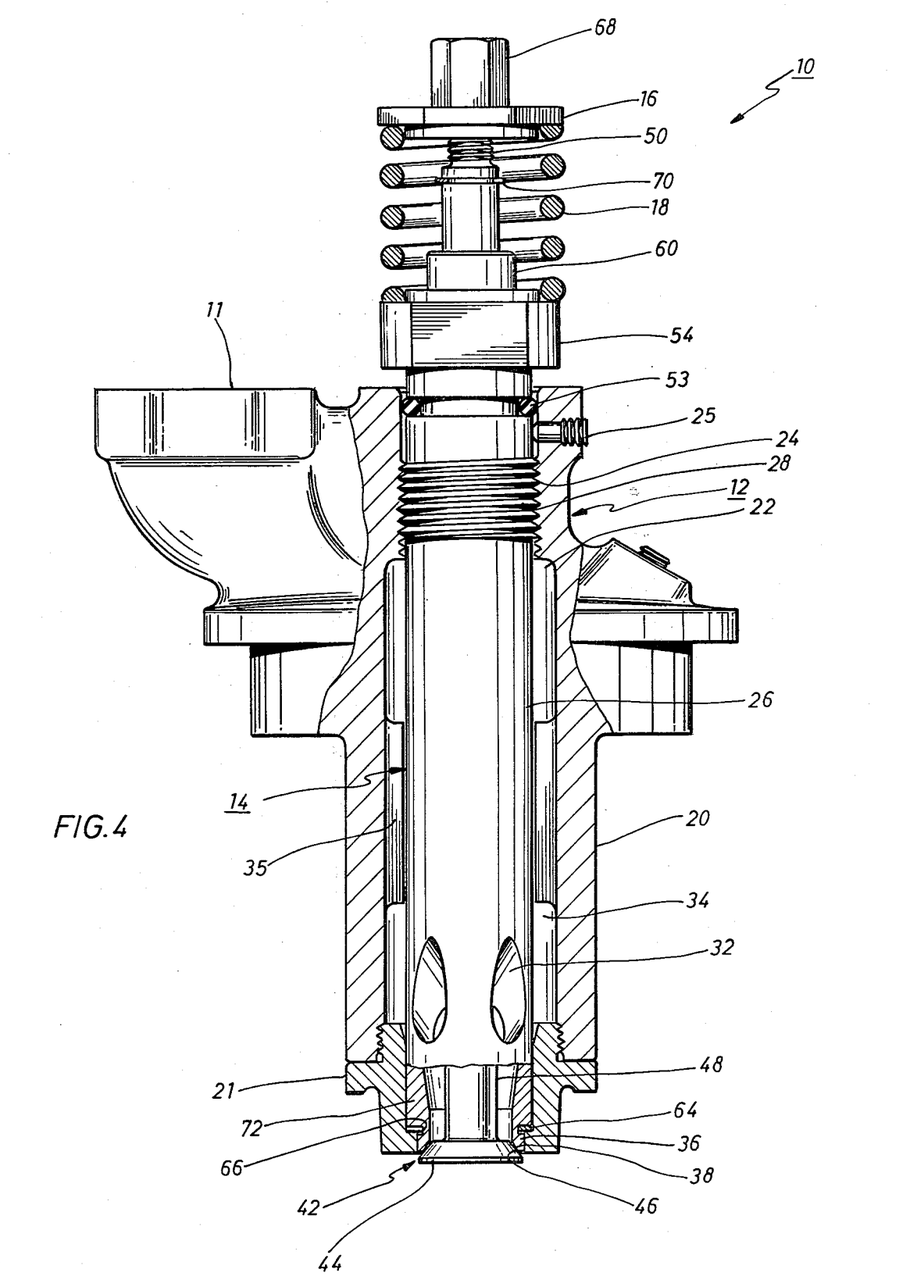
FIG. 4 is a side view of an alternate embodiment of the fuel injection valve assembly of the present invention, partially broken away for disclosure of detail.

In FIG. 4, a second embodiment of the fuel injection valve assembly 10 of the present invention is shown. The valve assembly of FIG. 4 is similar to the valve assembly shown in FIG. 1 in all respects except that the valve seat 36 is structurally formed as part of the stem housing 26 at the end of the stem housing opposite the outside threads 28, thereby obviating the need for counterbore 30. The valve seat portion of the stem housing is located in a cylindrical extension 72 of the stem housing having a diameter less than the diameter of the remainder of the stem housing. The gasket 64 and gasket-retaining groove 66 are located where the cylindrical extension 72 meets the remainder of the stem housing. The gasket 64, as with the preferred embodiment, provides a tight seal between the valve cartridge and the valve cage (i.e., the seat adaptor). In all other respects, the second embodiment of the fuel injection valve assembly is similar to the preferred embodiment shown in FIGS. 1, 2, and 3.

The fuel injection valve assembly of the present invention is used in a conventional manner in the operation of a reciprocating gas engine, i.e., in the same manner as those fuel injection valve assemblies in the prior art. Also, the operation of the present fuel injection valve assembly as installed in a reciprocating gas engine is the same for the preferred embodiment of FIG. 1 and the alternate embodiment of FIG. 4.

A combustible gas, such as natural gas, enters the fuel injection valve assembly at fuel inlet port 11 (not shown in detail) located on the outside of the valve cage. Though this combustible gas may enter the valve assembly at various pressures, a typical such pressure is 60 psig. The pressurized gaseous fuel fills annular space 34. Cage wall extensions 35 do not extend the full circumference of the inside wall of the valve cage, but only provide some guidance when inserting the cartridge into the valve cage. The cage wall extensions are optional and may not be provided. Thus, the pressurized fuel fills the entire annular space, including the area of the fuel seat ports 32.

The fuel seat ports 32 are inclined so that fuel enters directly into the stem housing 26 without any swirling effect. This design of the fuel seat ports and other configurational aspects of the valve assembly result in significantly increased fuel efficiency. Generally, a straighter flow path from annular space 34 into the combustion chamber will result in increased fuel efficiency. The best operational results have been obtained where the angle of the valve seat ports 32 relative to the vertical center line of the valve cartridge is approximately one half the angle of valve face 46 relative to the same center line. Also better operational results can be achieved when the individual parts of the valve cartridge are machined rather than formed by casting.

Fuel is allowed to flow through the fuel seat ports 32, across the valve face 46, and into the combustion chamber only when a conventional rocker arm pushes down on the nut 68 and overcomes the force exerted by external spring 18. When the rocker arm does exert the required force on the nut, the valve stem 48 moves downward, causing the valve to open and allow the fuel to flow across the valve face and into the combustion chamber where the fuel mixes with air that has entered the combustion chamber through an inlet port (not shown) in the engine cylinder. After the rocker arm has exerted its force and caused valve 42 to open, the external spring 18 causes the valve to close. Then, combustion of the fuel takes place in the combustion chamber. This process is, of course, repeated rapidly in accordance with the overall timing of the reciprocating gas engine.

It is to be understood that the invention will admit of other embodiments. The description of the two embodiments is given only to facilitate understanding of the invention by those skilled in the art and may not be construed as limiting the invention itself which is defined herein by the appended claims.

What is claimed is:

1. A fuel injection valve assembly for use in a reciprocating gas engine, comprising:
   (a) a valve cage adapted for mounting on the body of the engine by insertion of a cylindrical lower portion thereof into an opening in the engine body leading to a combustion chamber of the engine, said valve cage having a cartridge-receiving bore with threads at the end of the bore nearer the outside of the engine;
   (b) a valve cartridge having
      (1) a stem housing with outside threads engaging the threads of the cartridge-receiving bore, a valve seat at the end opposite the outside threads, and at least one fuel seat port between the outside threads and the valve seat, the port being adapted for the flow of fuel from an annular space, between inside wall of said valve cage and the outside of said valve cartridge, to a combustion chamber of the engine,
      (2) a valve with a substantially frustoconical element, the surface of which having a valve face adapted to fit tightly against the face of the valve seat, a valve stem attached to the frustoconical element and passing through the stem housing, the stem threads at the opposite end of the valve stem from the frustoconcial element;
   (c) a keeper ring threadably engaged with the stem threads of the valve; and
   (d) an external spring between said keeper ring and said valve cage, said external spring biasing the valve in the closed position.

2. A fuel injection valve assembly for use in a reciprocating gas engine, comprising:
   (a) a valve cage adapted for mounting on the body of the engine by insertion of a cylindrical lower portion thereof into an opening in the engine body leading to a combustion chamber of the engine, said valve cage having a cartridge-receiving bore with threads at the end of the bore nearer the outside of the engine;
   (b) a valve cartridge having
      (1) a stem housing with outside threads engaging the threads of the cartridge-receiving bore, a counterbore at the end opposite the outside threads, and at least one fuel seat port between the outside threads and the counterbore, the port being adapted for the flow of fuel from an annular space, between the inside wall of said valve cage and the outside of said valve cartridge, to a combustion chamber of the engine,
      (2) a valve seat with a seat face at one end and a first cylindrical extension at the other end, the first cylindrical extension being adapted to fit tightly into the counterbore of the stem housing,
      (3) a valve with a substantially frustoconical element, the surface of which having a valve face adapted to fit tightly against the seat face, a valve stem attached to the frustoconical element and passing through the stem housing and the valve seat, and stem threads at the opposite end of the valve stem from the frustoconical element;
   (c) a keeper ring threadably engaged with the stem threads of the valve; and
   (d) an external spring between said keeper ring and said valve cage, said external spring biasing the valve in the closed position.

3. A fuel injection valve assembly as defined in claim 1, or 2, wherein the stem housing has at least one interior bushing that guides the valve stem passing therethrough.

4. A fuel injection valve assembly as defined in claim 3, wherein the stem housing further contains packing and a packing biasing spring for providing a seal against the valve stem passing therethrough.

5. A fuel injection valve assembly as defined in claim 4, wherein the stem housing further contains a spacer element having an inside diameter greater than the inside diameter of the interior bushing, said spacer displacing the packing from the valve seat end of the stem housing.

6. A fuel injection valve assembly as defined in claim 4, wherein the stem housing further contains upper and lower wiper elements each having an inside diameter substantially equal to the diameter of the valve stem and an outside diameter substantially equal to the inside diameter of the stem housing, said wipers preventing foreign matter from entering the packing.

7. A fuel injection valve assembly as defined in claim 3, wherein the valve cage has an O-ring encircling the cylindrical lower portion thereof for providing a seal between the valve cage and the opening in the engine body into which the cylindrical lower portion is adapted to be inserted.

8. A fuel injection valve assembly as defined in claim 1 or 2, wherein the stem housing further includes a collar located above the outside threads, with said external spring being located between said keeper ring and the collar.

9. A fuel injection valve assembly as defined in claim 8, wherein the stem housing has an O-ring encircling its upper portion between the collar and the outside threads, said O-ring providing a tight seal between the stem housing and the valve cage.

10. A fuel injection valve assembly as defined in claim 8, wherein the section of the stem housing which includes the collar has an interior collar bushing that guides the valve stem passing therethrough, the interior collar bushing being separated from the other interior bushing of the stem housing by packing and a packing biasing spring located in the interior of that section of the stem housing which includes the outside threads.

11. A fuel injection valve assembly as defined in claim 1, wherein the valve seat portion of the stem housing is located in a cylindrical extension of the stem housing, the cylindrical extension being less in diameter than the remainder of the stem housing, the stem housing further including a gasket and gasket-retaining groove located where the cylindrical extension and remainder of the stem housing meet, the gasket providing a tight seal between said valve cartridge and said valve cage.

12. A fuel injection valve assembly as defined in claim 2, wherein the seat face is located in a second cylindrical extension of the valve seat on the side opposite the first cylindrical extension, the second cylindrical extension being less in diameter than the stem housing, the valve seat further including a gasket and gasket-retaining groove located where the second cylindrical extension and the remainder of the valve seat meet, the gasket providing a tight seal between said valve cartridge and said valve cage.

13. A fuel injection valve assembly as defined in claim 11, wherein the valve cage comprises a valve seal adaptor threadably engaging the cylindrical lower portion, the tight seal being provided between the valve cartridge and the seat adaptor.

14. A fuel injection valve assembly as defined in claims 1 or 2, wherein the valve stem has a reduced diameter at the end nearer the frustoconical element for providing less restricted fuel flow through the valve.

15. A fuel injection valve assembly as defined in claims 1 or 2, wherein the fuel seat ports are inclined so that the fuel enters directly into the stem housing without a swirling effect.

16. A valve cartridge for use in a fuel injection system for a reciprocating gas engine, comprising:
(a) a stem housing with an outside diameter less than the inside diameter of a cartridge-receiving bore of a valve cage on the engine whereby the valve cartridge is removable from the valve cage without removing the valve cage from the engine, said stem housing having
(1) outside threads adapted to engage threads of the cartridge-receiving bore, the bore leading to a combustion chamber of the engine,
(2) a valve seat at the end opposite the outside threads, and
(3) at least one fuel seat port between the outside threads and the valve seat, the port being adapted for the flow of fuel from outside said valve cartridge to a combustion chamber of the engine; and
(b) a valve having
(1) a substantially frustoconical element, the surface of which having a valve face adapted to fit tightly against the face of the valve seat and
(2) a valve stem attached to the frustoconical element and passing through the stem housing.

17. A valve cartridge for use in a fuel injection system for a reciprocating gas engine, comprising:
(a) a stem housing with an outside diameter less than the inside diameter of a cartridge-receiving bore of a valve cage on the engine whereby the valve cartridge is removable from the valve cage without removing the valve cage from the engine, said stem housing having
(1) outside threads adapted to engage threads of the cartridge-receivng bore, the bore leading to a combustion chamber of the engine,
(2) a counterbore at the end opposite the outside threads, and
(3) at least one fuel seat port between the outside threads and the counterbore, the port being adapted for the flow of fuel from outside said valve cartridge to a combustion chamber of the engine,
(b) a valve seat having
(1) a seat face on one end and
(2) a first cylindrical extension at the other end, the first cylindrical extension being adapted to fit tightly into the counterbore of said stem housing; and
(c) a valve having
(1) a substantially frustoconical element, the surface of which having a valve face adapted to fit tightly against the seat face and
(2) a valve stem attached to the frustoconical element and passing through the stem housing and the valve seat.

18. A valve cartridge as defined in claims 16 or 17, wherein the stem housing has at least one interior bushing that guides the valve stem passing therethrough.

19. A valve cartridge as defined in claim 18, wherein the stem housing further contains packing and a packing biasing spring for providing a seal against the valve stem passing therethrough.

20. A valve cartridge as defined in claim 19, wherein the stem housing further contains a spacer element having an inside diameter greater than the inside diameter of the interior bushing, said spacer displacing the packing from the valve seat end of the stem housing.

21. A valve cartridge as defined in claim 19, wherein the stem housing further contains upper and lower wiper elements each having an inside diameter substantially equal to the diameter of the valve stem and an outside diameter substantially equal to the inside diameter of the stem housing, said wipers preventing foreign matter from entering the packing.

22. A valve cartridge as defined in claim 18, wherein the stem housing further includes a collar located above the outside threads, the collar being adapted to support an exterior spring biasing the valve closed.

23. A valve cartridge as defined in claim 22, wherein the stem housing has an O-ring encircling its upper portion between the collar and the outside threads, said O-ring providing a tight seal between the stem housing and the valve cage.

24. A valve cartridge as defined in claim 22, wherein the section of the stem housing which includes the collar has an interior collar bushing that guides the valve stem passing therethrough, the interior collar bushing being separated from the other interior bushing of the stem housing by packing and a packing biasing spring located in the interior of that section of the stem housing which includes the outside threads.

25. A valve cartridge as defined in claim 16, wherein the valve seat portion of the stem housing is located in a cylindrical extension of the stem housing, the cylindrical extension being less in diameter than the remainder of the stem housing, the stem housing further including a gasket and gasket-retaining groove located where the cylindrical extension and remainder of the stem housing meet, the gasket providing a tight seal between said valve cartridge and the end of the cartridge-receiving bore.

26. A valve cartridge as defined in claim 17, where the seat face is located in a second cylindrical extension of the valve seat on the side opposite the first cylindrical extension, the second cylindrical extension being less in diameter than the stem housing, the valve seat further including a gasket and gasket-retaining groove located where the second cylindrical extension and the remainder of the valve seat meet, the gasket providing a tight seal between said valve cartridge and the end of the cartridge-receiving bore.

27. A valve cartridge as defined in claims 16 or 17, wherein the valve stem has a reduced diameter at the end nearer the frustoconical element for providing less restricted fuel flow through the valve.

28. A valve cartridge as defined in claims 16 or 17, wherein the fuel seat ports are inclined so that the fuel enters directly into the stem housing without a swirling effect.

29. A fuel injection valve assembly for use in a reciprocating gas engine, comprising:
 (a) a valve cage adapted for mounting on the body of the engine by insertion of a cylindrical lower portion thereof into an opening in the engine body leading to a combustion chamber of the engine, said valve cage having a cartridge-receiving bore and cartridge-engaging means for holding a valve cartridge in place within the cartridge-receiving bore;
 (b) a valve cartridge having
  (1) a stem housing with an attachment means for engaging the cartridge-engaging means at one end of the stem housing, a valve seat at the opposite end thereof, and at least one fuel seat port between the attachment means and the valve seat, the port being adapted for the flow of fuel from an annular space, between the inside wall of said valve cage and the outside of said valve cartridge, to a combustion chamber of the engine,
  (2) a valve with a substantially frustoconical element, the surface of which having a face adapted to fit tightly against the face of the valve seat, a valve stem attached to the frustoconical element and passing through the stem housing, and a stem-engaging means at the opposite end of the valve stem from the frustoconical element;
 (c) a keeper ring engaged with the stem-engaging means of the valve; and
 (d) an external spring between said keeper ring and said valve cage, said external spring biasing the valve in the closed position.

30. A fuel injection valve assembly for use in a reciprocating gas engine, comprising:
 (a) a valve cage adapted for mounting on the body of the engine by insertion of a cylindrical lower portion thereof into an opening in the engine body leading to a combustion chamber of the engine, said valve cage having a cartridge-receiving bore and a cartridge-engaging means for holding a valve cartridge in place within the cartridge-receiving bore;
 (b) a valve cartridge having
  (1) a stem housing with an attachment means for engaging the cartridge-engaging means at one end of the stem housing, a counterbore at the opposite end thereof, and at least one fuel seat port between the attachment means and the counterbore, the port being adapted for the flow of fuel from an annular space, between the inside wall of said valve cage and the outside of said valve cartridge, to a combustion chamber of the engine,
  (2) a valve seat with a seat face at one end and a first cylindrical extension at the other end, the first cylindrical extension being adapted to fit tightly into the counterbore of the stem housing,
  (3) a valve with a substantially frustoconical element, the surface of which having a valve face adapted to fit tightly against the seat face, a valve stem attached to the frustoconical element and passing through the stem housing and the valve seat, and a stem-engaging means at the opposite end of the valve seat from the frustoconical element;
 (c) a keeper ring engaged with the stem-engaging means of the valve; and
 (d) an external spring between said keeper ring and said valve cage, said external spring biasing the valve in the closed position.

31. A valve cartridge for use in a fuel injection system for a reciprocating gas engine, comprising:
 (a) a stem housing with an outside diameter less than the inside diameter of a cartridge-receiving bore of a valve cage on the engine whereby the valve cartridge is removable from the valve cage without removing the valve cage from the engine, said stem housing having
  (1) an attachment means adapted for engaging a cartridge-engaging means on the valve cage and holding the valve cartridge within the cartridge-receiving bore, the bore leading to a combustion chamber of the engine
  (2) a valve seat at the end opposite the attachment means, and
  (3) at least one fuel seat port between the attachment means and the valve seat, the port being adapted for the flow of fuel from outside said valve cartridge to a combustion chamber of the engine; and
 (b) a valve having
  (1) a substantially frustoconical element, the surface of which having a valve face adapted to fit tightly against the face of the valve seat and
  (2) a valve stem attached to the frustoconical element and passing through the stem housing.

32. A valve cartridge for use in a fuel injection system for a reciprocating gas engine, comprising:
 (a) a stem housing with an outside diameter less than the inside diameter of a cartridge-receiving bore of a valve cage on the engine whereby the valve cartridge is removable from the valve cage without removing the valve cage from the engine, said stem housing having
    (1) an attachment means adapted for engaging a cartridge-engaging means on the valve cage and holding the valve cartridge within the cartridge-receiving bore, the bore leading to a combustion chamber of the engine,
    (2) a counterbore at the end opposite the attachment means, and
    (3) at least one fuel seat port between the attachment means and the counterbore, the port being adapted for the flow of fuel from outside said valve cartridge to a combustion chamber of the engine;
 (b) a valve seat having
    (1) a seat face on one end and
    (2) a first cylindrical extension at the other end, the first cylindrical extension being adapted to fit tightly into the counterbore of said stem housing; and
 (c) a valve having
    (1) a substantially frustoconical element, the surface of which having a valve face adapted to fit tightly against the seat face and
    (2) a valve stem attached to the frustoconical element and passing through the stem housing and the valve seat.

33. A fuel injection valve assembly as defined in claim 12, wherein the valve cage comprises a valve seat adaptor threadably engaging the cylindrical lower portion, the tight seal being provided between the valve cartridge and the seat adaptor.

* * * * *

UNITED STATES PATENT AND TRADEMARK OFFICE
CERTIFICATE OF CORRECTION

PATENT NO. : 4,365,756

DATED : December 28, 1982

INVENTOR(S) : Timothy Z. Fisher

It is certified that error appears in the above—identified patent and that said Letters Patent is hereby corrected as shown below:

```
Column 9, line 45, delete "1, or 2" and insert
     --1, 2, 29 or 30--.

Column 9, line 21, delete "claim" and insert
     --claims--; line 22, delete "1," and insert
     --1 or 29--.

Column 9, line 30, delete "claim" and insert
     --claims--; line 31, delete "2," and insert
     --2 or 30--.

Column 9, line 41, delete "seal" and insert
     --seat--.

Column 9, line 46, delete "1 or 2" and insert
     --1, 2, 29 or 30--.

Column 9, line 50, delete "1 or 2" and insert
     --1, 2, 29 or 30--.

Column 10, line 41, delete "16 or 17" and insert
     --16, 17, 31 or 32--.

Column 10, line 60, delete "claim 18" and insert
     --claims 18, 31 or 32--.
```

UNITED STATES PATENT AND TRADEMARK OFFICE
CERTIFICATE OF CORRECTION

PATENT NO. : 4,365,756
DATED : December 28, 1982
INVENTOR(S) : Timothy Z. Fisher It is certified that error appears in the above—identified patent and that said Letters Patent is hereby corrected as shown below:

Column 11, line 9, delete "claim 16" and insert --claims 16 or 31--.

Column 11, line 19, delete "claim 17" and insert --claims 17 or 32--.

Column 11, line 30, delete "claims 16 or 17" and insert --claims 16, 17, 31 or 32--.

Column 11, line 34, delete "claims 16 or 17" and insert --claims 16, 17, 31 or 32--.

Signed and Sealed this

Fifth Day of March 1985

[SEAL]

Attest:

DONALD J. QUIGG

Attesting Officer     Acting Commissioner of Patents and Trademarks